United States Patent [19]

Fujimoto et al.

[11] Patent Number: 5,343,700
[45] Date of Patent: Sep. 6, 1994

[54] AIR-FUEL RATIO CONTROL SYSTEM FOR INTERNAL COMBUSTION ENGINES

[75] Inventors: Sachito Fujimoto; Toshikazu Oketani; Yoshiharu Abe, all of Wako, Japan

[73] Assignee: Honda Giken Kogyo Kabushiki Kaisha, Tokyo, Japan

[21] Appl. No.: 876,996

[22] Filed: May 1, 1992

[30] Foreign Application Priority Data

May 13, 1991 [JP] Japan .................................. 3-138206

[51] Int. Cl.$^5$ .............................................. F01N 3/20
[52] U.S. Cl. ........................................ 60/276; 60/285; 123/674; 123/681; 123/691
[58] Field of Search .............. 60/274, 276, 285; 123/674, 679, 681, 682, 683, 684, 691

[56] References Cited

U.S. PATENT DOCUMENTS

| | | | |
|---|---|---|---|
| 4,733,358 | 3/1988 | Abthoff | 60/276 |
| 4,809,501 | 3/1989 | Kayanuma | 60/276 |
| 4,831,838 | 5/1989 | Nagai | 60/276 |
| 4,901,240 | 2/1990 | Schmidt | 123/674 |
| 5,065,726 | 11/1991 | Klenk | 123/674 |
| 5,077,970 | 1/1992 | Hamburg | 60/277 |
| 5,117,631 | 6/1992 | Moser | 123/691 |
| 5,193,339 | 3/1993 | Furuya | 123/691 |

*Primary Examiner*—Douglas Hart
*Attorney, Agent, or Firm*—Nikaido, Marmelstein, Murray & Oram

[57] ABSTRACT

In an air-fuel ratio control system for an internal combustion engine, an output from a first air-fuel ratio sensor arranged upstream of a three-way catalyst mounted across an exhaust passage of the engine is compared with a reference value during feedback control of the air-fuel ratio. The reference value is controlled based on an output from a second air-fuel ratio sensor arranged downstream of the three-way catalyst. The reference value is changed in dependence on the engine load detected.

10 Claims, 6 Drawing Sheets

AIR-FUEL RATIO CONTROL SYSTEM FOR INTERNAL COMBUSTION ENGINES

BACKGROUND OF THE INVENTION

1. (Field of the Invention)

This invention relates to an air-fuel ratio control system for internal combustion engines, and more particularly to an air-fuel ratio control system having air-fuel ratio sensors arranged, respectively upstream and downstream of a three-way catalyst mounted across an exhaust passage of the engine.

2. (Prior Art)

Conventionally, there has been widely used a method of feedback-controlling the air-fuel ratio of a mixture supplied to an internal combustion engine (hereinafter referred to as the "supply air-fuel ratio") based on results of comparison between an output from an air-fuel ratio sensor arranged upstream of a three-way catalyst mounted across an exhaust passage of the engine and a reference value. Further, control systems are also conventionally known in which the feedback control is corrected based on an output from a second air-fuel ratio sensor additionally provided downstream of the three-way catalyst. Such control systems include the following ones:

(1) An air-fuel ratio control system proposed by Japanese Provisional Patent Publication (Kokai) No. 53-103796, in which the reference value used in the feedback control is changed according to the output from the second sensor in order to determine whether the performance of the first sensor has been degraded.

(2) Air-fuel ratio control systems proposed by Japanese Provisional Patent Publications (Kokai) Nos. 61-234241 and 61-232349, in which a proportional term or an integral term used in the feedback control are set according to the output from the second sensor in order to improve the responsiveness of the feedback control when the performance of the first sensor is degraded.

In general, when the engine operating condition has shifted to a high load region, the air-fuel ratio detected by the second sensor tends to be drastically enriched due to transient fuel-increasing correction. As a result, according to the air-fuel ratio control method employed by the above example (1), the reference value used in the feedback control is largely changed in the direction of leaning the air-fuel ratio, in response to the enriched second air-fuel ratio. Therefore, the supply air-fuel ratio is more often subjected to leaning correction, which makes it impossible to readily obtain a rich air-fuel mixture for achieving the required high engine output. This unfavorable state will then be eliminated by a gradual increase in the reference value through feedback control. However, there is still the problem that sufficient engine output cannot be obtained immediately after transition of the engine operating condition to the high load region, resulting in degraded driveability.

SUMMARY OF THE INVENTION

It is the object of the invention to provide an air-fuel ratio control system for an internal combustion engine, which is capable of properly setting a reference value which is compared with an output from a first air-fuel ratio sensor, to thereby prevent degradation of the driveability due to insufficient engine output which can otherwise occur when load on the engine changes.

To attain the above object, the present invention provides an air-fuel ratio control system for an internal combustion engine having an exhaust passage, and a three-way catalyst arranged across the intake passage, the air-fuel ratio control system including a first air-fuel ratio sensor arranged in the exhaust passage at a location upstream of the three-way catalyst, a second air-fuel ratio sensor arranged in the exhaust passage at a location downstream of the three-way catalyst, a control device for controlling a reference value with which is compared with an output from the first air-fuel ratio sensor, based on an output from the second air-fuel ratio sensor, and an engine load-detecting device for detecting load on the engine.

The air-fuel ratio control system according to the invention is characterized by comprising a reference value-changing device for changing the reference value in dependence on the detected load on the engine.

According to the air-fuel ratio control system according to the invention, it is possible to set the reference value for the air-fuel ratio control in response to the load on the engine, and thereby effectively change the desired air-fuel ratio over a wide range of engine load between a low engine load region and a high engine load region, which enables to prevent degradation of the driveability due to insufficient engine output when the load on the engine is changed while the engine is in the feedback control region.

Preferably, the reference value-changing device comprises reference value-calculating device for calculating the reference value in each of regions defined according to the load on the engine, and reference value-storing for calculating and storing an average value of the calculated reference value at an area thereof corresponding to each region, the stored average value being adopted as the reference value when the detected load belongs to each region.

According to this prefered embodiment, a learned value of the reference value is obtained in each engine load region, which uses the reference value suitable for each engine load region.

More preferably, the speed of averaging the reference value in calculating the average value is set to a larger value as the detected load on the engine increases.

According to this preferred embodiment, it is possible to calculate a learned value of the reference value responsive to the speed of feedback control of the reference value.

Preferably, the average value of the reference value calculated in the each region is used as an initial value of the reference value applied in feedback control of the air-fuel ratio when the load on the engine has shifted to each region.

According to this preferred embodiment, when the load on the engine is shifted to any load region, the reference value is immediately changed to a value suitable for the load region, which effects the air-fuel ratio control in a manner suitable for the load region, and more effectively prevent insufficient engine output upon a change in the engine load while the engine is in the feedback control region, thereby preventing degradation of the driveability.

Further preferably, the average value of the reference value used when the load on the engine has shifted to the each region is continuously applied in feedback control of the air-fuel ratio for a predetermined time period.

According to this preferred embodiment, immediately after the engine load has been shifted to any load region, the learned value of the reference value obtained in the load region is used over the predetermined time period, and hence the feedback control of the reference value is inhibited during the predetermined time period, which prevents the reference value from being affected by changes in the air-fuel ratio accompanying the shifting of the engine load region, especially a drastically enriched air-fuel ratio by transient fuel-increasing correction occurring when the engine has shifted to the high load region, whereby it is possible to effectively secure the engine output required in the engine load region.

The above and other objects, features, and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
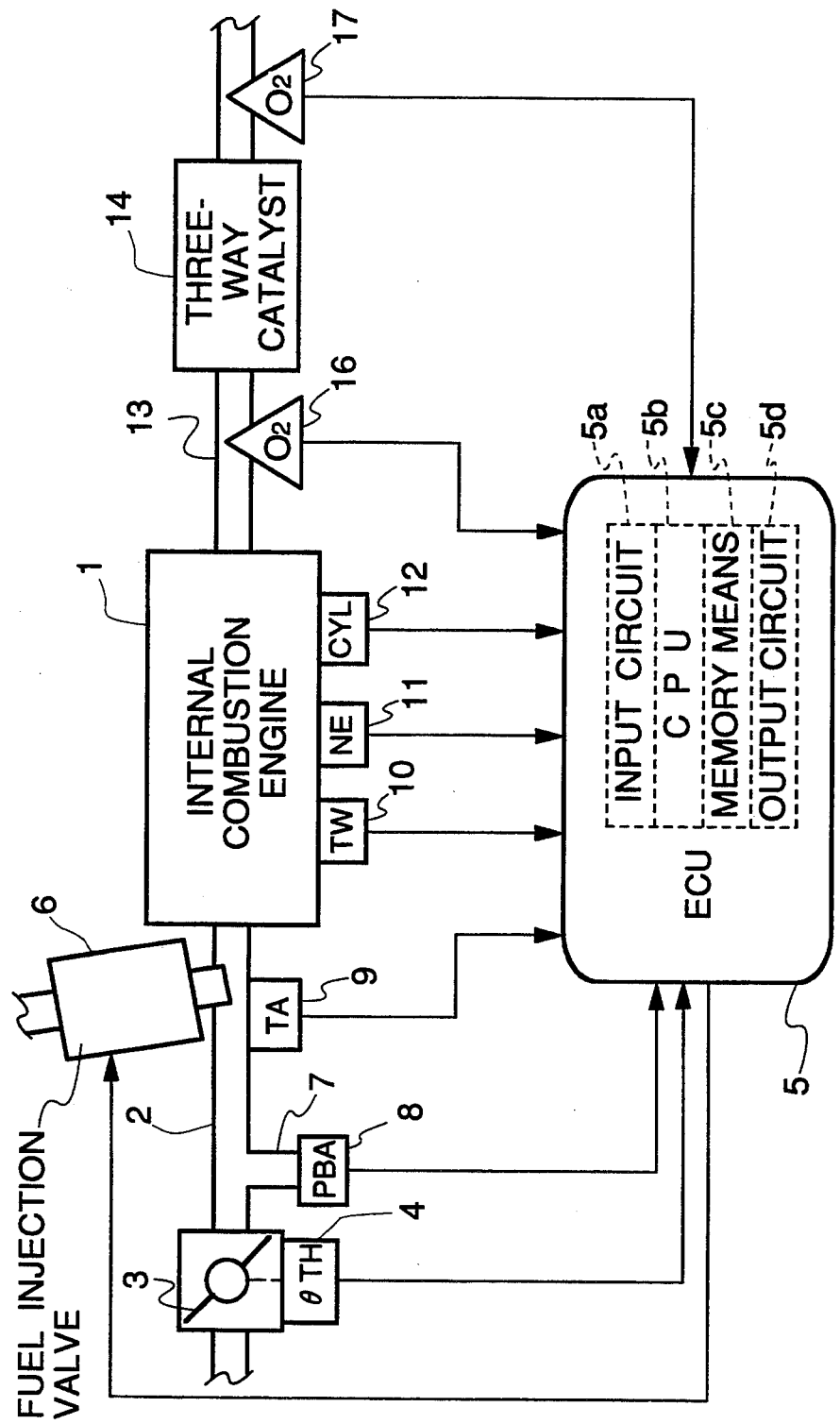
FIG. 1 is a block diagram showing the whole arrangement of an air-fuel ratio control system according to the invention.

Referring first to FIG. 1, there is shown the whole arrangement of an air-fuel ratio control system according to the invention. In an intake pipe 2 of an engine 1, there is arranged a throttle valve 3 to which is connected a throttle valve opening ($\theta TH$) sensor 4 for generating an electric signal indicative of the sensed throttle valve opening and supplying same to an electronic control unit (hereinafter referred to as "the ECU") 5.

Fuel injection valves 6 are each provided for each cylinder and arranged in the intake pipe between the engine 1 and the throttle valve 3, and at a location slightly upstream of an intake valve, not shown. The fuel injection valves 6 are connected to a fuel pump, not shown, and electrically connected to the ECU 5 to have their valve opening periods controlled by signals therefrom.

An intake pipe absolute pressure (PBA) sensor 8 is provided in communication with the interior of the intake pipe 2 via a conduit 7 at a location immediately downstream of the throttle valve 3 for supplying an electric signal indicative of the sensed absolute pressure to the ECU 5. An intake temperature (TA) sensor 9 is inserted into the intake pipe 2 at a location downstream of the intake pipe absolute pressure sensor 8 for supplying an electric signal indicative of the sensed intake temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5. An engine rotational speed (NE) sensor 11 and a cylinder-discriminating (CYL) sensor 12 are arranged in facing relation to a camshaft or a crankshaft of the engine 1, neither of which is shown. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5.

A three-way catalyst 14 is arranged within an exhaust pipe 13 connected to the cylinder block of the engine 1 for purifying noxious components such as HC, CO and $NO_X$. At locations upstream and downstream of the three-way catalyst in the exhaust pipe 13, there are respectively arranged oxygen concentration sensors 16, 17 (hereinafter referred to as "the first $O_2$ sensor 16" and "the second $O_2$ sensor 17") as air-fuel ratio sensors, for detecting the concentration of oxygen present in the exhaust gases and supplying electric signals indicative of values of the oxygen concentration detected by the $O_2$ sensors to the ECU 5, respectively.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed in the CPU 5b and for storing results of calculations therefrom, etc., and an output circuit 5d which outputs driving signals to the fuel injection valves 6.

The CPU 5b operates in response to the above-mentioned signals from the sensors to determine operating conditions in which the engine 1 is operating such as an air-fuel ratio feedback control region and open-loop control regions, and calculates, based upon the determined operating conditions, the valve opening period or fuel injection period $T_{OUT}$ over which the fuel injection valves 6 are to be opened by the use of the following equation (1) in synchronism with inputting of TDC signal pulses to the ECU 5:

$$T_{OUT} = Ti \times KO_2 \times K_1 + K_2 \qquad (2)$$

where Ti represents a basic fuel amount, more specifically a basic fuel injection period which is determined according to the engine rotational speed Ne and the intake pipe absolute pressure PBA. The value of Ti is determined by a Ti map stored in the memory means 5c.

$KO_2$ represents an air-fuel ratio correction coefficient calculated based on outputs from the $O_2$ sensors 16, 17. During the air-fuel ratio feedback control, the value of the coefficient $KO_2$ is set to such values as to cause the air-fuel ratio (i.e. the oxygen concentration) to become equal to a desired value, whereas during the open-loop control, it is set to predetermined values dependent, respectively, on the open-loop control regions of the engine.

$K_1$ and $K_2$ represent other correction coefficients and correction variables, respectively, which are calculated based on various engine parameter signals to such values as to optimize characteristics of the engine such as fuel consumption and accelerability depending on engine operating conditions.

The CPU 5b performs calculations as described heretofore, and supplies the fuel injection valves 6 with driving signals based on the calculation results through the output circuit 5d.

In addition, the ECU 5 forms reference value-changing means and reference value-storing means.

Figure 2:
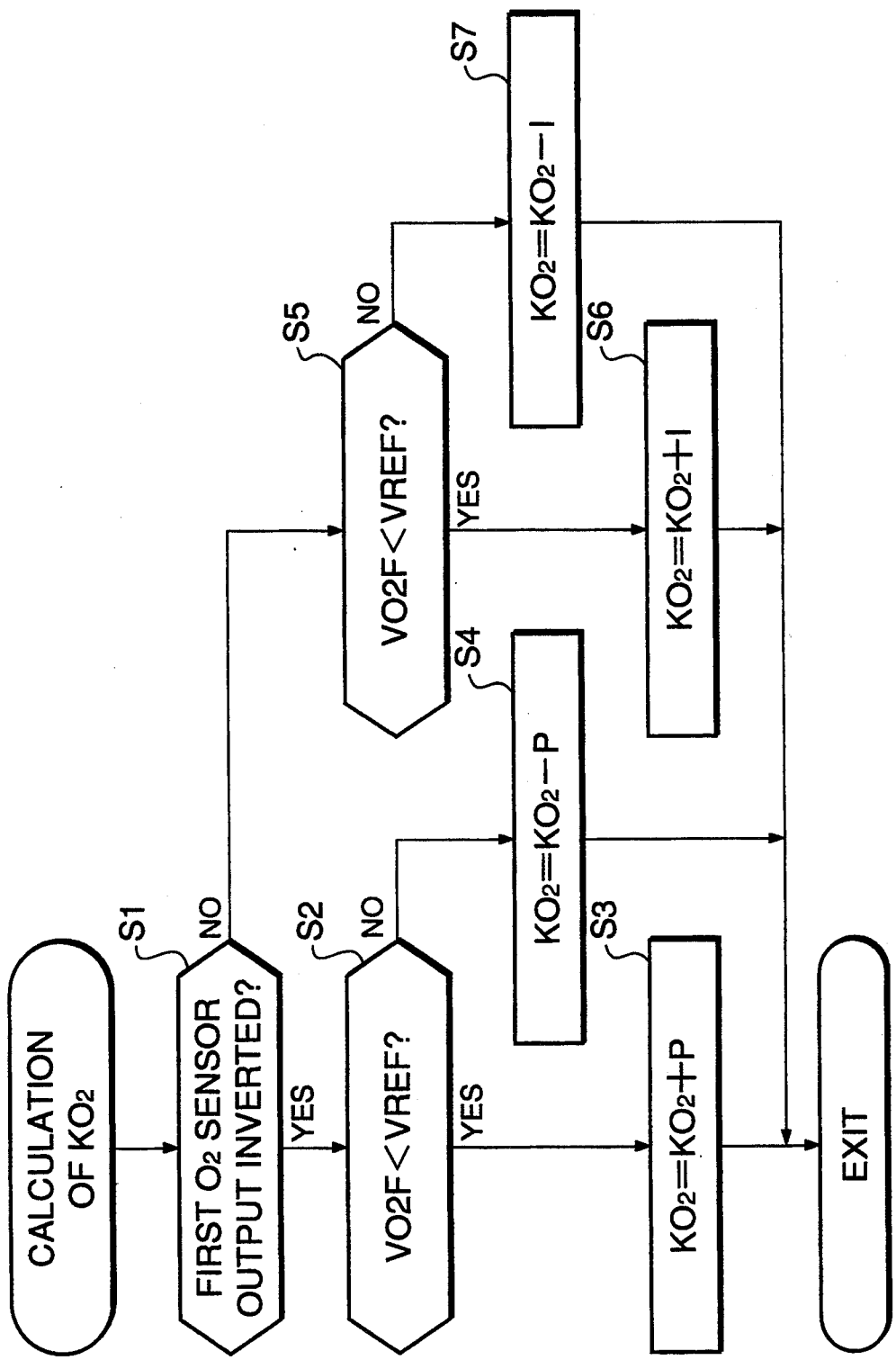
FIG. 2 is a flowchart of a program for calculating an air-fuel ratio correction coefficient ($KO_2$)

FIG. 2 shows a program for calculating the air-fuel ratio correction coefficient $KO_2$ during the feedback control. This program is carried out in synchronism with inputting of each TDC signal pulse to the ECU 5.

At a step S1, it is determined whether or not the output VO2F from the first $O_2$ sensor 16 has been inverted, i.e. whether it has been changed from a lower lever to a higher level with respect to a reference value VREF or vice versa. If the answer to this question is affirmative (YES), so-called P-term (proportional term) control is carried out at steps S2 to S4.

More specifically, it is determined at a step S2 whether or not the output VO2F from the first $O_2$ sensor 16 is lower than the reference value VREF. If the answer to this question is affirmative (YES), a P-term (>0) is added to the immediately preceding value of the coefficient $KO_2$ at a step S3, whereas if the answer is negative (NO), the P-term is subtracted from same at a step S4, whereby the present value of the coefficient $KO_2$ is calculated.

If the answer to the question of the step S1 is negative (NO), i.e. if the output from the first $O_2$ sensor 16 has not been inverted, so-called I-term (integral term) control is carried out at steps S5 to S7. More specifically, it is determined at a step S5, similarly to the step S2, whether or not the sensor output VO2F is lower than the reference value VREF. If the answer to this question is affirmative (YES), an I-term (>0) is added to the immediately preceding value of the coefficient $KO_2$ at a step S6, whereas if the answer is negative (NO), the I-term is subtracted from the immediately preceding value of the coefficient $KO_2$ at a step S7, whereby the present value of the coefficient $KO_2$ is calculated.

The addition or subtraction of the I-term need not be carried out at each loop of the program, but may be carried out at intervals of a predetermined number of loops.

According to the above described manner of calculation of the air-fuel ratio correction coefficient $KO_2$, shown in FIG. 2, when VO2F<VREF stands, the coefficient $KO_2$ is corrected in such a direction as to enrich the supply air-fuel ratio, whereas when VO2F≧VREF stands, it is corrected in an opposite manner i.e. in such a direction as to lean the supply air-fuel ratio.

In the present embodiment, the reference value VREF is set according to the output VO2R from the second $O_2$ sensor 17 in a manner described below with reference to FIGS. 3 to 6.

Figure 3:
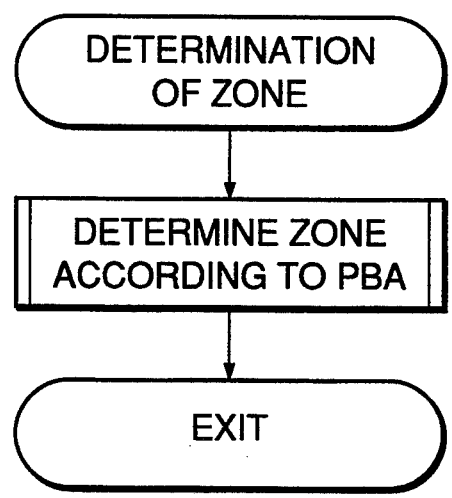
FIG. 3 is a flowchart of a program for determining engine load regions (ZONE's)

First, a ZONE determination is carried out based on the sensed intake pipe absolute pressure PBA, as shown in FIG. 3. The ZONE determination is to determine in which of regions, i.e. ZONE's 0 to 5, defined according to predetermined values PBA0 to PBA4 of the intake pipe absolute pressure PBA, the detected PBA value falls. It is determined that if PBA>PBA0, PBA belongs to ZONE0, if PBAi≧PBA>PBA(i+1) (i=0 to 3), it belongs to ZONEi, and if PBA≦PBA4, it belongs to ZONE5.

Figure 4:
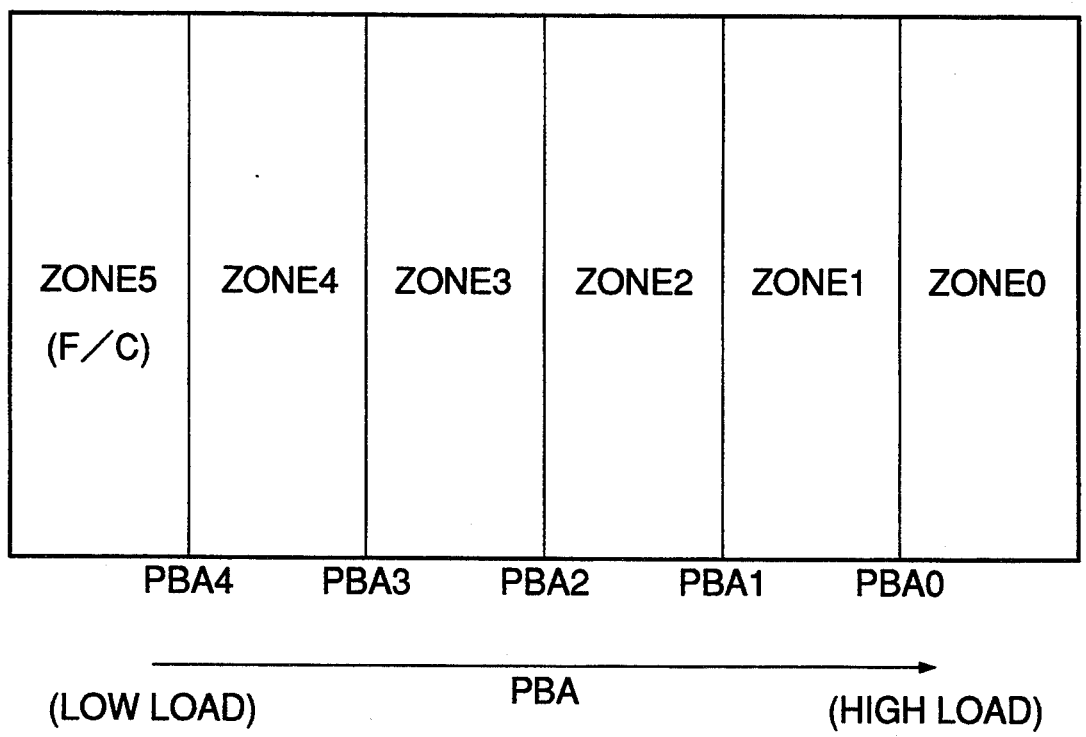
FIG. 4 is a diagram useful in explaining the engine load regions (ZONE's)

The region ZONE5 is a region in which the supply of fuel to the engine is stopped (i.e. fuel cut is effected), as indicated by a symbol of F/C in FIG. 4.

Further, the predetermined values PBA0 to PBA4 may be provided with hysteresis. That is, for example, the predetermined value PBA1 may be set to different values between when the pressure PBA changes from ZONE1 to ZONE2 and when it changes from ZONE2 to ZONE1.

Figure 5:
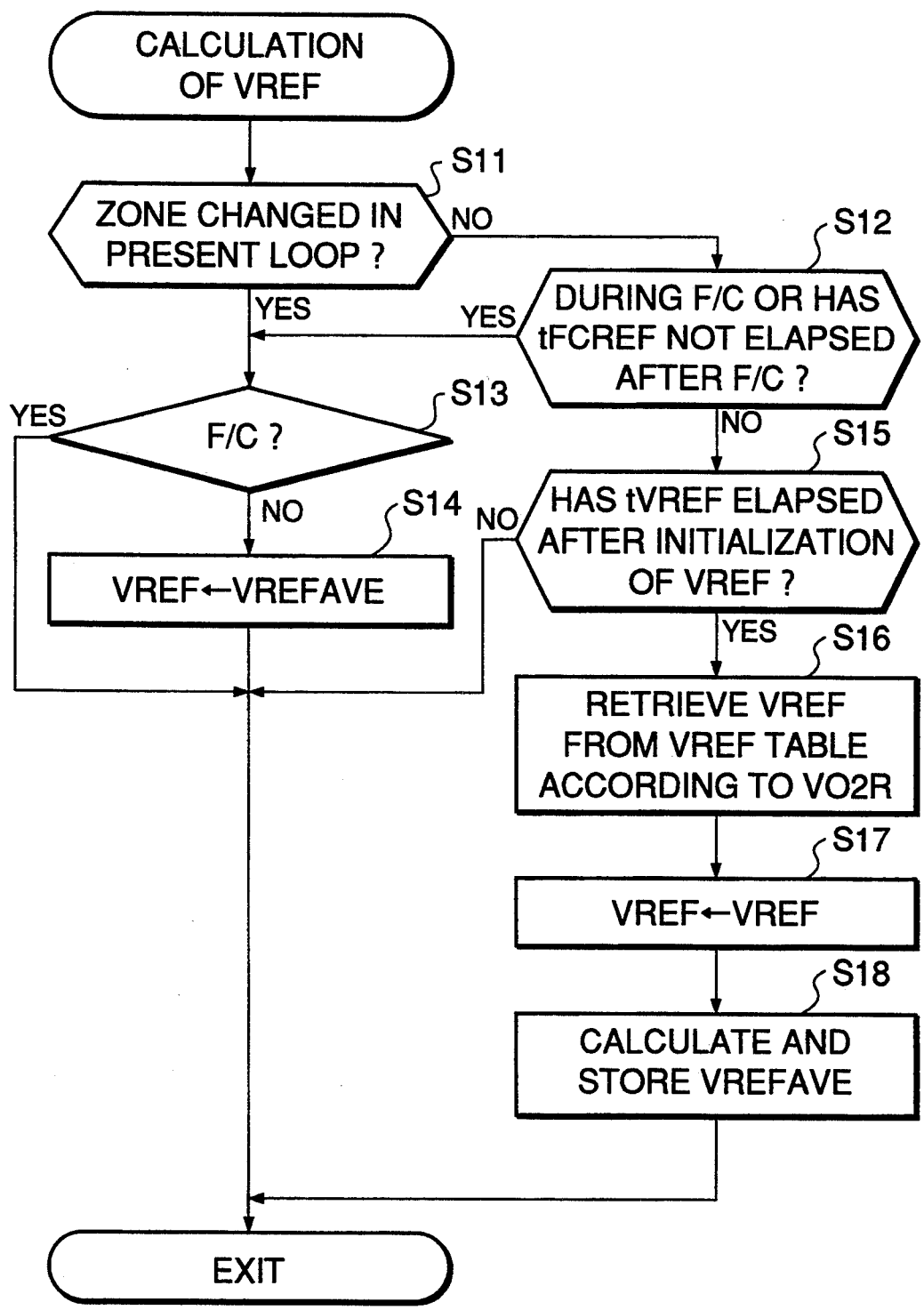
FIG. 5 is a flowchart of a program for setting a reference value (VREF) used in the air-fuel ratio feedback control.

FIG. 5 shows a program for calculating the reference value VREF used in calculating the air-fuel ratio correction coefficient $KO_2$.

At a step S11, it is determined whether or not the present value of the intake pipe absolute pressure PBA belongs to a different ZONE from one to which the immediately preceding value of the pressure PBA belonged. If the answer to this question is affirmative (YES), it is determined at a step S13 whether or not the fuel cut is being effected (i.e. the pressure PBA belongs to ZONE5). If the answer to this question is affirmative (YES), the present program is immediately terminated. Accordingly, the reference value VREF is not renewed, but is held at the immediately preceding value. If the answer to the question of the step S13 is negative (NO), i.e. if the fuel cut is not being effected, the reference value VREF is set to an average value VREFAVE calculated at a step S18 described hereinafter (the averaged value has been obtained in a ZONE to which the present value of the pressure PBA belongs) to thereby initialize the reference value VREF.

If the answer to the question of the step S11 is negative (NO), i.e. if the present value of the pressure PBA belongs to the same ZONE to which the immediately preceding value of the pressure PBA belonged, it is determined at a step S12 whether or not the fuel cut is being effected (i.e. the present value of the pressure PBA belongs to ZONE5) or whether the present loop is within a first predetermined time period tFCREF elapsed after termination of the fuel cut. If the answer to this question is affirmative (YES), the program proceeds to the step S13, whereas if the answer is negative (NO), it is determined at a step S15 whether or not a second predetermine time period tVREF has elapsed after the reference value VREF was initialized at the step S14. If the answer to this question is negative (NO), i.e. if the second predetermined time period tVREF has not elapsed after the initialization of the reference value VREF, the present program is terminated without renewing the reference value VREF, and hence the reference value VREF is held at the value initialized at the step S13. This is intended to secure a time period for stabilization of the VREF value after initialization thereof in view of the fact that the intended results to be obtained by the use of the learned on average value through initialization of the reference value VREF to the average value VREFAVE cannot be achieved if the reference value VREF is renewed immediately after initialization of same.

Figure 6:
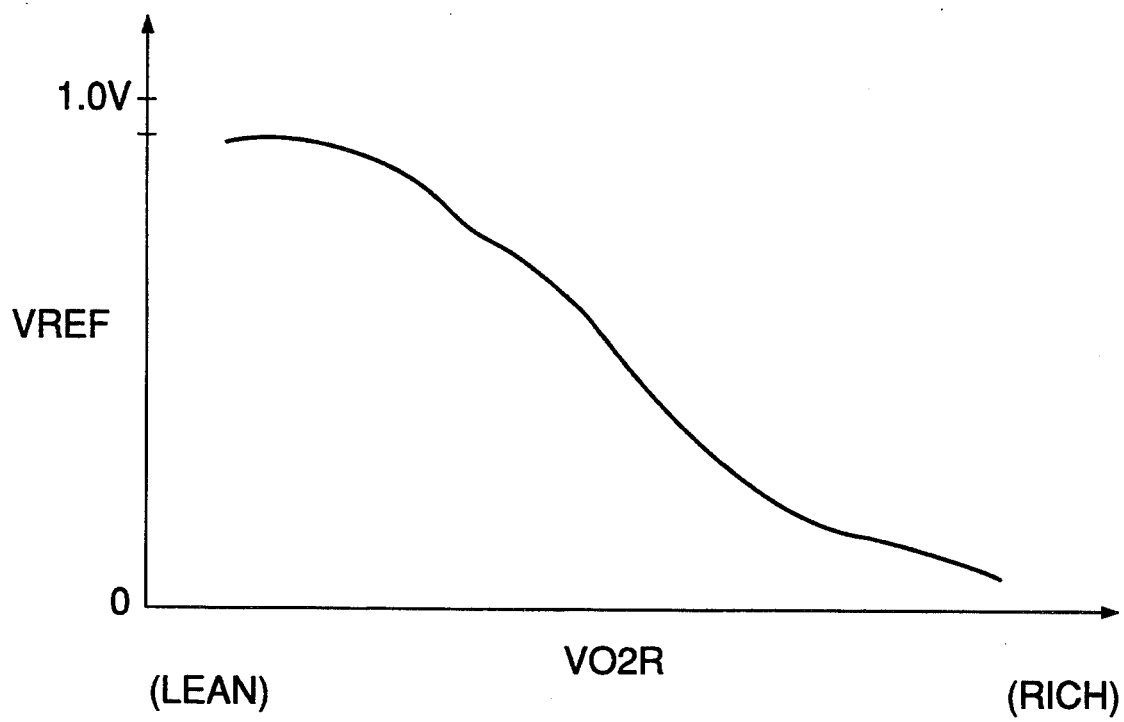
FIG. 6 is a diagram showing a table of the reference value (VREF), values of which are set according to an output (VO2R) from a second air-fuel ratio sensor.

If the answer to the question of the step S15 is affirmative (YES), i.e. if the second predetermined time period has elapsed after the initialization of the reference value VREF, the reference value VREF is read from a VREF table according to the output VO2R from the second $O_2$ sensor 17 at a step S16. The VREF table is set, for example, as shown in FIG. 6, in such a manner that as the output VO2R from the second $O_2$ sensor 17 assumes a larger value (i.e. the air-fuel ratio is richer), the reference value VREF assumes a smaller value.

At the next step S17, the reference value VREF is set to a new value obtained at the step S16.

Then, at a step S18, the average value VREFAVE of the reference value VREF is calculated by the use of the following equation (2), and the results of the calculation are stored into the memory means 5c at a storage area corresponding to the region ZONEi to which the present PBA value belongs:

$$VREFAVE = VREFAVE \times CVREF/256 + VREF \times (256 - CVREF)/256 \quad (2)$$

where VREFAVE on the right side represents one of the averages values which correspond to ZONE0 to ZONE4, respectively, and have been renewed up to the immediately preceding loop of the present program, CVREF an averaging coefficient determining the averaging speed (i.e. the degree of contribution of the present value of the reference value VREF to the resulting average value VREFAVE), which is set to different values corresponding to ZONE0 to ZONE4, respectively, and VREF the reference value VREF read at the step S16.

The averaging coefficient (speed of averaging) CVREF is set to a larger value as the load on the engine, which is represented by the intake pipe absolute pressure PBA in the present embodiment, is higher. This is because as the engine load is higher, the amount and flow velocity of exhaust gases become larger, and hence the time lag in the feedback control system decreases.

According to the above described manner of calculating the reference value VREF, shown in FIG. 5, when the load on the engine changes from one ZONE to another, the feedback control in the new ZONE starts with the reference value VREF being initialized to a corresponding one of values of the average value VREFAVE calculated in the respective ZONE's defined according to the engine load. Therefore, it is possible to prevent the engine output from becoming insufficient to cause degraded driveability upon transition of the engine operation from a low-load operating condition to a high-load operating condition.

Figure 7:
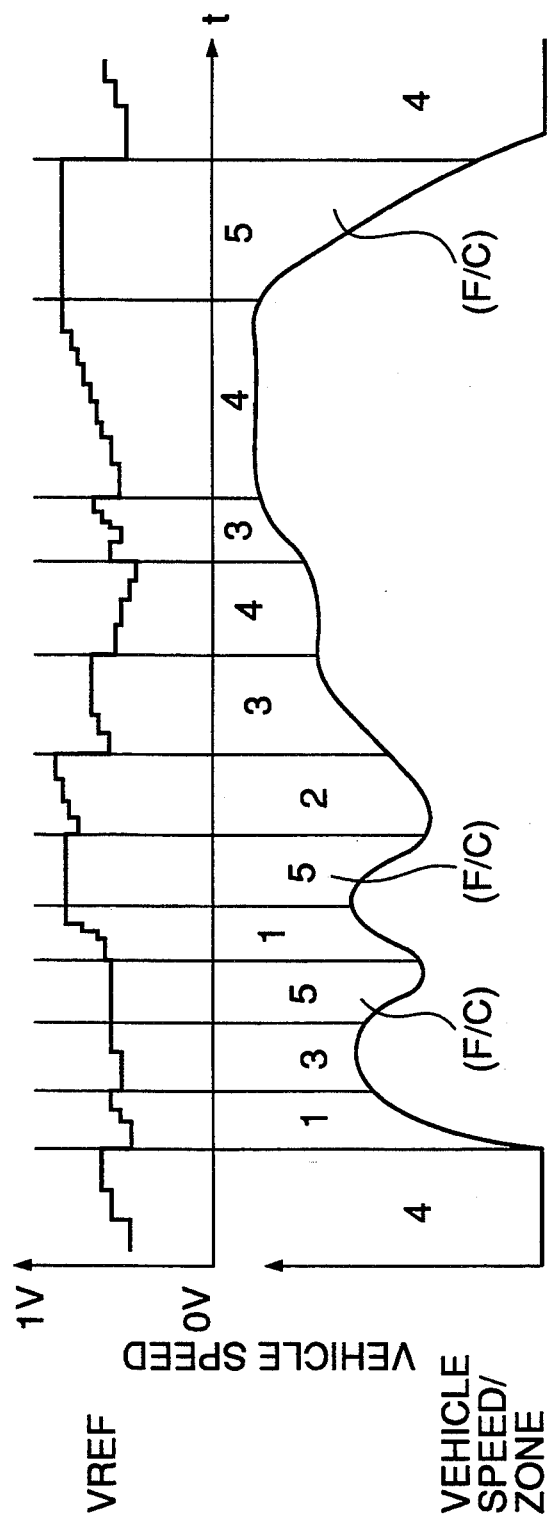
FIG. 7 is a timing chart showing changes in the reference value (VREF) with changes in the vehicle speed.

FIG. 7 shows changes in the reference value VREF occurring as the vehicle speed (the travelling speed of an automotive vehicle on which the engine is installed) varies. The figure shows changes in the reference value VREF in a simplified manner. As will be easily understood, the number of changes in the reference value VREF which will take place in each ZONE except ZONE5 after the lapse of the predetermined time period tVREF is actually far larger than that shown in the figure. When the intake pipe absolute pressure PBA (i.e. the engine load) has changed to a different ZONE, the reference value VREF is immediately set to a value of the average value VREFAVE calculated in the ZONE, so that the reference value VREF changes discontinously upon transition from one ZONE to another. This enables to prevent a delay in the air-fuel ratio feedback control when the engine load changes suddenly and greatly.

What is claimed is:

1. In an air-fuel ratio control system for an internal combustion engine having an exhaust passage, and a three-way catalyst arranged across said exhaust passage, said air-fuel ratio control system comprising:
    a first air-fuel ratio sensor arranged in said exhaust passage at a location upstream of said three-way catalyst;
    a second air-fuel ratio sensor arranged in said exhaust passage at a location downstream of said three-way catalyst;
    control means for controlling an air-fuel ratio of a mixture supplied to said engine in a feedback manner responsive to a result of a comparison between an output from said first air-fuel ratio sensor and a reference value which is compared with said output from said first air-fuel ratio sensor, said control means controlling said reference value based on an output from said second air-fuel ratio sensor such that as the output from said second air-fuel ratio sensor indicates a richer air-fuel ratio value, said reference value is set to a value which makes said air-fuel ratio of said mixture leaner;
    engine load-detecting means for detecting load on said engine; and
    reference value-changing means for selectively changing said reference value in dependence on the detected load on said engine to make said air-fuel ratio of said mixture richer and leaner, wherein an increase in an output from said engine is obtained upon an increase in said load on said engine.

2. An air-fuel ratio control system according to claim 1, wherein said reference value-changing means comprises reference value-calculating means for calculating said reference value in each of regions defined according to said load on said engine, and reference value-storing means for calculating and storing an average value of the calculated reference value at at an area thereof corresponding to said each region, said stored average value being adopted as said reference value when the detected load belongs to said each region.

3. An air-fuel ratio control system according to claim 2, wherein the speed of averaging said reference value in calculating said average value is set to a larger value as the detected load on said engine increases.

4. An air-fuel ratio control system according to claim 3, wherein said engine includes an intake passage, and said engine load-detecting means detects pressure Within said intake passage.

5. An air-fuel ratio control system according to any of claims 2 to 4, wherein said average value of said reference value calculated in said each region is used as an initial value of said reference value applied in feedback control of the air-fuel ratio when said load on said engine has shifted to said each region.

6. An air-fuel ratio control system according to claim 5, wherein said average value of said reference value used when said load on said engine has shifted to said each region is continuously applied in feedback control of the air-fuel ratio for a predetermined time period.

7. In an air-fuel ratio control system for an internal combustion engine having an exhaust passage, and a three-way catalyst arranged across said exhaust passage, said air-fuel ratio control system comprising:
    a first air-fuel ratio sensor arranged in said exhaust passage at a location upstream of said three-way catalyst;
    a second air-fuel ratio sensor arranged in said exhaust passage at a location downstream of said three-way catalyst;

control means for controlling a reference value which is compared with an output from said first air-fuel ratio sensor, based on an output from said second air-fuel ratio sensor;

engine load-detecting means for detecting load on said engine; and reference value-changing means for selectively changing said reference value in dependence on the detected load on said engine, wherein said reference value-changing means comprises reference value-calculating means for calculating said reference value in each of regions defined in according to said load on said engine, and reference value-storing means for calculating and storing an average value of the calculated reference value at an area thereof corresponding to said each region, said stored average value being used as said reference value when the detected load belongs to said each region, and wherein a speed of averaging said reference value in calculating said average value is set to a larger value as the detected load on said engine increases.

8. An air-fuel ratio control system according to claim 7, wherein said engine includes an intake passage, and said engine load-detecting means detects pressure within said intake passage.

9. An air-fuel ratio control system according to claim 7, wherein said average value of said reference value calculated in said each region is used as an initial value of said reference value applied in feedback control of the air-fuel ratio when said load on said engine has shifted to said each region.

10. An air-fuel ratio control system according to claim 9, wherein said average value of said reference value used when said load on said engine has shifted to said each region is continuously applied in feedback control of the air-fuel ratio for a predetermined time period.

* * * * *